United States Patent
Saha et al.

(10) Patent No.: US 10,938,795 B2
(45) Date of Patent: *Mar. 2, 2021

(54) SYSTEMS AND METHODS FOR REDUCING CYBER SECURITY INCIDENTS WITH INTELLIGENT PASSWORD MANAGEMENT

(71) Applicant: Honeywell International Inc., Morris Plains, NJ (US)

(72) Inventors: Avijit Saha, Bangalore (IN); Manu Thomas, Chennai (IN); Jitendra Sitaram Chaurasia, Mumbai (IN); Deepak Sundar Meganathan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,451

(22) Filed: Jul. 29, 2019

(65) Prior Publication Data

US 2019/0379648 A1 Dec. 12, 2019

Related U.S. Application Data

(63) Continuation of application No. 15/467,747, filed on Mar. 23, 2017, now Pat. No. 10,404,672.

(51) Int. Cl.
*H04L 29/06* (2006.01)

(52) U.S. Cl.
CPC ............ *H04L 63/06* (2013.01); *H04L 63/083* (2013.01); *H04L 63/1433* (2013.01)

(58) Field of Classification Search
CPC . H04L 2463/121; H04L 41/048; H04L 51/08; H04L 51/12; H04L 63/0428;
(Continued)

(56) References Cited

U.S. PATENT DOCUMENTS

| 8,332,918 B2 | 12/2012 | Vedula et al. |
| 9,071,972 B1 * | 6/2015 | Wang .................... H04W 12/08 |

(Continued)

FOREIGN PATENT DOCUMENTS

| JP | 201237948 A | 2/2012 |
| WO | 2014019129 A1 | 2/2014 |
| WO | 2015096501 A1 | 7/2015 |

OTHER PUBLICATIONS

Extended European search report from corresponding EP patent application 18155935.2, dated Aug. 3, 2018.
(Continued)

*Primary Examiner* — Abiy Getachew
(74) *Attorney, Agent, or Firm* — Seager, Tufte & Wickhem, LLP

(57) ABSTRACT

Systems and methods for reducing cyber security incidents in video surveillance and security systems with intelligent password management are provided. Some methods can include assessing a vulnerability of a current password for each of a plurality of cameras, responsive to detecting that the current password for at least one of the plurality of cameras is vulnerable, automatically generating an updated password for the at least one of the plurality of cameras, and assigning the updated password to the at least one of the plurality of cameras.

20 Claims, 1 Drawing Sheet

(58) Field of Classification Search
CPC ... H04L 63/0807; H04L 63/083; H04L 67/02; H04L 69/04; H04L 9/14; H04L 63/0838; H04L 63/0846; H04L 9/0891; H04L 9/3226; H04L 63/06; H04L 63/1433; H04L 9/0863; H04L 63/068; H04W 12/0608; H04W 4/029; H04W 84/01; G06F 21/45; G06F 2221/2101; H04N 7/181

See application file for complete search history.

(56) References Cited

U.S. PATENT DOCUMENTS

| | | | |
|---|---|---|---|
| 2008/0201780 A1* | 8/2008 | Khan | G06F 21/577 726/25 |
| 2011/0252071 A1 | 10/2011 | Cidon | |
| 2012/0158894 A1 | 6/2012 | Desgagne et al. | |
| 2013/0263250 A1 | 10/2013 | Leckey et al. | |
| 2014/0098247 A1 | 4/2014 | Rao et al. | |
| 2014/0189808 A1* | 7/2014 | Mahaffey | H04L 63/0853 726/4 |
| 2016/0073218 A1* | 3/2016 | Shui | H04W 76/10 455/41.2 |

OTHER PUBLICATIONS

Bisson, "Latest Security News," The State of Security, 73,000 Security Cameras Viewable Online Due to Use of Default Passwords, Nov. 7, 2014, http://www.tripwire.com/state-of-security-news/7300-security-cameras-viewable-online-due-to-use-of-default-passwords/.

AsiaOne Digital, Over 700 webcam feeds in Singapore leaked online, Nov. 10, 2014, http://digital.asiaone.com/digital/news/over-700-surveillance-cameras-singapore-compromised.

* cited by examiner

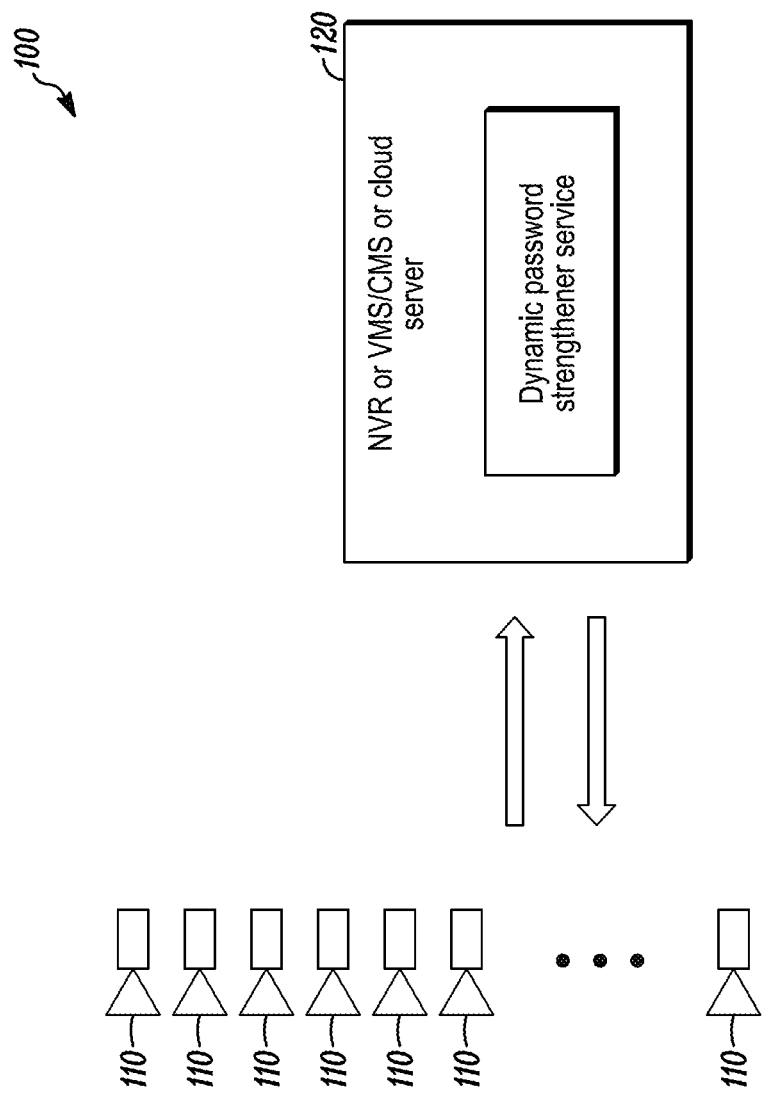

SYSTEMS AND METHODS FOR REDUCING CYBER SECURITY INCIDENTS WITH INTELLIGENT PASSWORD MANAGEMENT

The present application is a Continuation of U.S. patent application Ser. No. 15/467,747, filed Mar. 23, 2017, entitled, "SYSTEMS AND METHODS FOR REDUCING CYBER SECURITY INCIDENTS WITH INTELLIGENT PASSWORD MANAGEMENT," which is hereby incorporated by reference.

FIELD

The present invention relates generally to video surveillance and security systems. More particularly, the present invention relates to systems and methods for reducing cyber security incidents in video surveillance and security systems with intelligent password management.

BACKGROUND

Known video surveillance and security systems can be installed in facilities, such as an airport, a hospital, a casino, a commercial building, a utility building, a residential home, and the like, and can include hundreds of cameras, most of which are IP cameras. One of the major risks associated with these types of deployments is that they are not safe from unauthorized access. Indeed, known video surveillance and security systems do not manage the passwords of peripheral devices and cameras, thereby leading to weak or no passwords for such devices.

For example, when a video surveillance and security system is installed, it is known for a user to configure IP cameras in the system with a default user name and password, thereby making the commissioning of the system easy and fast. However, it is very easy for an unauthorized person to identify the default password for a camera. Indeed, many user manuals include such details in the public domain.

It is also known for a user to maintain passwords of cameras in a video surveillance and security system in a spreadsheet. However, when such data is lost or goes missing, a user cannot modify the cameras without authentication. Indeed, when a password for a camera is lost, the user must reset the camera, which often results in the camera password reverting to the default password. Furthermore, when password data that is maintained in a spreadsheet is leaked or disclosed, even to an inside threat, a user must reconfigure the cameras in the system with a new password, which is a time intensive process, especially when the system includes hundreds or thousands of cameras. Indeed, changing camera passwords at periodic intervals, even in a preventative manner, is often too time consuming and requires too much user effort to justify doing so.

In view of the above, there is a continuing, ongoing need for improved systems and methods.

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for reducing cyber security incidents in video surveillance and security systems with intelligent password management. For example, systems and methods disclosed herein can include a dynamic password strengthener service that can detect the vulnerability of passwords for each camera in the video surveillance and security system and, responsive thereto, automatically rectify any such vulnerability by automatically reassigning a secured password to the camera and notifying a user of the same.

Systems and methods disclosed herein are described in connection with video surveillance and security systems. It is to be understood that such systems can include, but are not limited to, systems that include a central monitoring station in communication with a plurality of cameras, systems that include a cloud application being executed on a server and in communication with a plurality of cameras, and/or systems that include an NVR, VMS, or CMS installed on a cloud server in communication with a plurality of cameras.

Systems and methods disclosed herein are also described in connection with security cameras. However, it is to be understood that systems and methods disclosed herein are not so limited and can be used in connection with any security device with a user name and password, such as, for example, intrusion control panels, intrusion gateways, IoT devices, and access entry points, including access card readers and access card control panels.

In accordance with disclosed embodiments, systems and methods disclosed herein can periodically assess the vulnerability of passwords for each of a plurality of cameras by, for example, sensing activities occurring in a monitored region, identifying a camera as having a default password, identifying a camera as having a blank or no password, or identifying a camera as having a user configured password that is weak. Upon detecting that the password for one of the cameras is vulnerable, systems and methods disclosed herein can generate a secured password, assign the generated password to the camera, and notify a user of the newly assigned password.

For example, in some embodiments, a plurality of cameras can be installed in a monitored region during the commissioning of the region and can be configured with a default password. During the commissioning, systems and methods disclosed herein can assess the passwords for each of the plurality of cameras, and, upon detecting the default password for each of the plurality of cameras, systems and methods disclosed herein can automatically generate a unique password for and assign the unique password to each of the plurality of cameras and automatically transmit a respective generated password to each of the plurality of cameras, thereby saving a user from configuring passwords for the cameras manually. In some embodiments, during planned maintenance times for the deployment of the cameras, systems and methods can reassess the passwords for each of the plurality of cameras and, upon detecting a default password for any of the plurality of cameras, for example, one of the cameras that was installed after the commissioning of the region, automatically generate a new unique password for and assign the new unique password to any such camera.

In some embodiments, a plurality of cameras can be installed in a monitored region, and each of the plurality of cameras can have a unique password associated therewith. When a password for one of the cameras is lost or disclosed, a user can provide manual user input indicative of the same, and, responsive thereto, systems and methods disclosed herein can automatically generate a new unique password for and assign the new unique password to the one camera. Accordingly, systems and methods can assign passwords on an as needed basis. In some embodiments, passwords generated and assigned in accordance with systems and methods disclosed herein can only be accessed by a user with system administrator credentials, thereby maintaining the security thereof.

In some embodiments, security cameras can be installed in a residential home and communicate with a cloud service, which can periodically, for example, once daily or as otherwise configured, assess the password for all security cameras in communication therewith. Upon identifying a camera with a default password assigned thereto, the cloud service can automatically generate a unique password for and assign the unique password to the camera and automatically transmit the generated password to the camera.

Advantageously, systems and methods disclosed herein can increase security in communications with security cameras because default and blank passwords can be reassigned with strong and secure passwords. Furthermore, because systems and methods disclosed herein can automatically assign passwords to security cameras, systems and methods disclosed herein can advantageously reduce the commissioning and maintenance time associated with known systems and methods.

FIG. 1 is a block diagram of a system 100 in accordance with disclosed embodiments. As seen in FIG. 1, the system 100 can include a plurality of cameras 110 in bidirectional wired or wireless communication with a central monitoring station, a server, an NVR, VMS, CMS, or a cloud server 120 that can execute and provide the dynamic password strengthener service as described above.

For example, the central monitoring station, the server, the NVR, VMS, CMS, or the cloud server 120 can be implemented with a transceiver device for communicating with the plurality of cameras 110 and a memory device for storing information related to camera passwords. Each of the transceiver and the memory device can be in communication with control circuitry, one or more programmable processors, and executable control software, for example, a cloud application, as would be understood by one of ordinary skill in the art. In some embodiments, the executable control software can be stored on a transitory or non-transitory computer readable medium, including, but not limited to, local computer memory, RAM, optical storage media, magnetic storage media, flash memory, and the like, and some or all of the control circuitry, the programmable processors, and the control software can Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
a server in communication with a plurality of password protectable devices assessing a vulnerability of a current password for at least one of the plurality of password protectable devices by detecting that the current password for the at least one of the plurality of password protectable devices is a default password for the at least one of the plurality of password protectable devices, that the current password for the at least one of the plurality of password protectable devices is blank, or that the current password for the at least one of the plurality of password protectable devices is weak;
responsive to detecting that the current password for the at least one of the plurality of password protectable devices is vulnerable, the server automatically generating an updated password for the at least one of the plurality of password protectable devices; and
the server assigning the updated password to the at least one of the plurality of password protectable devices.

2. The method of claim 1 further comprising the server transmitting a notification of the updated password to the at least one of the plurality of password protectable devices or to a user.

3. The method of claim 1 wherein the plurality of password protectable devices comprise one or more building control devices.

4. The method of claim 3 wherein the one or more building control devices comprise a building security device.

5. The method of claim 1 wherein the plurality of password protectable devices comprise one or more IoT devices.

6. The method of claim 1 further comprising the server detecting that the current password for the at least one of the plurality of password protectable devices is vulnerable includes determining that the at least one of the plurality of password protectable devices has no password.

7. The method of claim 1 further comprising the server detecting that the current password for the at least one of the plurality of password protectable devices is vulnerable when the server receives user input indicating that the current password for the at least one of the plurality of password protectable devices is lost, stolen, or disclosed.

8. The method of claim 1 wherein the updated password for the at least one of the plurality of password protectable devices is a unique password.

9. The method of claim 1 further comprising the server assessing the vulnerability of the current password for the at least one of the plurality of password protectable devices after installation of the at least one of the plurality of password protectable devices.

10. The method of claim 1 further comprising the server assessing the vulnerability of the current password for the at least one of the plurality of password protectable devices during maintenance of the at least one of the plurality of password protectable devices.

11. The method of claim 1 further comprising the server periodically assessing the vulnerability of the current password for the at least one of the plurality of password protectable devices at predetermined time intervals.

12. The method of claim 1 further comprising the server assessing the vulnerability of the current password for the at least one of the plurality of password protectable devices responsive to receiving user input.

13. A system comprising:
a transceiver device of a server in communication with a plurality of building control devices;
a programmable processor of the server; and
executable control software stored on a non-transitory computer readable medium of the server, wherein the programmable processor and the executable control software of the server assess a vulnerability of a current password for at least one of the plurality of building control devices by detecting that the current password for the at least one of the plurality of building control devices is a default password for the at least one of the plurality of building control devices, that the current password for the at least one of the plurality of building control devices is blank, or that the current password for the at least one of the plurality of building control devices is weak, wherein, responsive to detecting that the current password for the at least one of the plurality of building control devices is vulnerable, the programmable processor and the executable control software automatically generate an updated password for the at least one of the plurality of building control devices, and wherein the programmable processor and the executable control software assign the updated password to the at least one of the plurality of building control devices.

14. The system of claim 13, wherein the plurality of building control devices comprises one or more security devices.

15. The system of claim 13 wherein the programmable processor and the executable control software of the server are further configured to detect that the current password for the at least one of the plurality of building control devices is vulnerable by determining that the at least one of the plurality of building control devices has no password.

16. The system of claim 13 wherein the programmable processor and the executable control software of the server are further configured to detect that the current password for the at least one of the plurality of building control devices is vulnerable when the server receives user input indicating that the current password for the at least one of the plurality of building control devices is lost, stolen, or disclosed.

17. The system of claim 13 wherein the programmable processor and the executable control software of the server are further configured to assess the vulnerability of the current password for the at least one of the plurality of building control devices after installation of the at least one of the plurality of building control devices.

18. The system of claim 13 wherein the programmable processor and the executable control software of the server are further configured to perform one or more of:

periodically assess the vulnerability of the current password for the at least one of the plurality of building control devices at predetermined time intervals; and assess the vulnerability of the current password for the at least one of the plurality of building control devices responsive to receiving user input.

19. A method comprising:

assessing over a network a vulnerability of a current password for at least one of a plurality of network connected devices by detecting that the current password for the at least one of the plurality of network connected devices is a default password for the at least one of the plurality of network connected devices, that the current password for the at least one of the plurality of network connected devices is blank, or that the current password for the at least one of the plurality of network connected devices is weak;

responsive to detecting that the current password for the at least one of the plurality of network connected devices is vulnerable, automatically generating an updated password for the at least one of the plurality of network connected devices; and automatically setting the password of the at least one of the plurality of network connected devices to the generated updated password.

20. The method of claim 19, wherein the current password for at least one of a plurality of network connected devices is assessed and automatically set using system administrator credentials.

* * * * *